(12) United States Patent
Hao et al.

(10) Patent No.: US 8,773,436 B1
(45) Date of Patent: Jul. 8, 2014

(54) PIXEL CHARTS WITH DATA DEPENDENT DISPLAY SPACES

(75) Inventors: Ming C. Hao, Palo Alto, CA (US); Umeshwar Dayal, Palo Alto, CA (US); Mark S. Anspach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 940 days.

(21) Appl. No.: 11/527,867

(22) Filed: Sep. 27, 2006

(51) Int. Cl.
*G06T 11/20* (2006.01)
*G09G 5/22* (2006.01)

(52) U.S. Cl.
USPC .................................. 345/440; 345/440.2

(58) Field of Classification Search
CPC ............................ G03T 11/206; G03T 11/203
USPC ................... 345/440, 440.2, 470, 35
See application file for complete search history.

(56) References Cited

U.S. PATENT DOCUMENTS

| | | | |
|---|---|---|---|
| 3,487,308 A | 12/1969 | Johnson | |
| 5,491,779 A * | 2/1996 | Bezjian | 345/440 |
| 5,581,797 A | 12/1996 | Baker | |
| 5,608,904 A | 3/1997 | Chaudhuri et al. | |
| 5,623,590 A | 4/1997 | Becker et al. | |
| 5,623,598 A | 4/1997 | Voigt et al. | |
| 5,634,133 A | 5/1997 | Kelley | |
| 5,659,768 A | 8/1997 | Forbes et al. | |
| 5,694,591 A | 12/1997 | Du et al. | |
| 5,757,356 A | 5/1998 | Takasaki et al. | |
| 5,801,688 A | 9/1998 | Mead et al. | |
| 5,878,206 A | 3/1999 | Chen et al. | |
| 5,893,090 A | 4/1999 | Friedman | |
| 5,903,891 A | 5/1999 | Chen et al. | |
| 5,924,103 A | 7/1999 | Ahmed et al. | |
| 5,929,863 A | 7/1999 | Tabei et al. | |
| 5,940,839 A | 8/1999 | Chen et al. | |
| 5,986,673 A | 11/1999 | Martz | |
| 5,999,193 A | 12/1999 | Conley, Jr. et al. | |
| 6,052,890 A | 4/2000 | Malagrino, Jr. et al. | |
| 6,144,379 A | 11/2000 | Bertram et al. | |
| 6,211,880 B1 | 4/2001 | Impink, Jr. | |
| 6,211,887 B1 | 4/2001 | Meier et al. | |
| 6,269,325 B1 | 7/2001 | Lee et al. | |
| 6,400,366 B1 * | 6/2002 | Davies et al. | 345/440 |
| 6,429,868 B1 | 8/2002 | Dehner, Jr. et al. | |
| 6,466,946 B1 | 10/2002 | Mishra et al. | |
| 6,502,091 B1 | 12/2002 | Chundi et al. | |
| 6,584,433 B1 | 6/2003 | Zhang et al. | |

(Continued)

FOREIGN PATENT DOCUMENTS

EP 0778001 11/1996

OTHER PUBLICATIONS

Keim, Daniel A., Ming C. Hao, and Umeshwar Dayal. "Hierarchical Pixel Bar Charts." IEEE Transactions on Visualization and Computer Graphics Jul.-Sep. 8, 2002: 255-69.*

(Continued)

*Primary Examiner* — Ke Xiao
*Assistant Examiner* — Robert Craddock (57) ABSTRACT

A method, apparatus, and system are disclosed for pixel charts with data dependent display spaces. One embodiment is a method for software execution. The method includes building a pixel bar chart having plural bars with different heights and different widths; and simultaneously displaying the plural bars of the pixel bar chart.

19 Claims, 5 Drawing Sheets

(56) References Cited

U.S. PATENT DOCUMENTS

| | | |
|---|---|---|
| 6,590,577 B1 | 7/2003 | Yonts |
| 6,603,477 B1 | 8/2003 | Tittle |
| 6,658,358 B2 | 12/2003 | Hao et al. |
| 6,684,206 B2 | 1/2004 | Chen et al. |
| 6,727,926 B1 | 4/2004 | Utsuki et al. |
| 6,934,578 B2 | 8/2005 | Ramseth |
| 7,020,869 B2 | 3/2006 | Abrari et al. |
| 7,202,868 B2 | 4/2007 | Hao et al. |
| 7,221,474 B2 | 5/2007 | Hao et al. |
| 7,313,533 B2 | 12/2007 | Chang et al. |
| 7,342,582 B2 * | 3/2008 | Chickering et al. .......... 345/440 |
| 7,567,250 B2 | 7/2009 | Hao et al. |
| 7,714,876 B1 | 5/2010 | Hao |
| 7,924,283 B1 | 4/2011 | Hao |
| 7,932,906 B2 | 4/2011 | Hao |
| 2002/0118193 A1 | 8/2002 | Halstead, Jr. |
| 2002/0171662 A1* | 11/2002 | Lee ............................. 345/593 |
| 2003/0065546 A1 | 4/2003 | Gorur et al. |
| 2003/0071815 A1 | 4/2003 | Hao et al. |
| 2003/0128212 A1 | 7/2003 | Pitkow |
| 2003/0221005 A1 | 11/2003 | Betge-Brezetz et al. |
| 2004/0051721 A1 | 3/2004 | Ramseth |
| 2004/0054294 A1 | 3/2004 | Ramseth |
| 2004/0054295 A1 | 3/2004 | Ramseth |
| 2004/0201588 A1 | 10/2004 | Meanor |
| 2004/0210540 A1 | 10/2004 | Israel et al. |
| 2005/0066026 A1 | 3/2005 | Chen et al. |
| 2005/0119932 A1 | 6/2005 | Hao |
| 2005/0219262 A1* | 10/2005 | Hao et al. ...................... 345/619 |
| 2006/0059439 A1* | 3/2006 | Hao et al. ...................... 715/805 |
| 2006/0095858 A1 | 5/2006 | Hao et al. |
| 2007/0225986 A1 | 9/2007 | Bowe, Jr. et al. |
| 2009/0033664 A1 | 2/2009 | Hao et al. |

OTHER PUBLICATIONS

Deun et al., Multidimensional Scaling, Open and Distance Learning, Jan. 12, 2000 (pp. 1-16).

Wojciech Basalaj, http://www.pavis.org/essay/multidimensional_scaling.html, 2001 (pp. 1-30).

D. Keim et al Pixel Bar Charts: A New Technique for Visualization Large Multi-Attribute Data Sets with Aggregation, HP Technical Report, 2001, pp. 1-10.

M. Ankerst et al "Towards an effective cooperation of the computer and the computer user for classification, Proc. 6th Int. Conf. on Knowledge Discovery and Data Mining," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Jessica Lin, Eamonn Keogh, Stefano Lonardi, Jeffrey P. Lankford, Donna M. Nystrom; Visually Mining and Monitoring Massive Time Series; International Conference on Knowledge Discovery and Data Mining archive, Proceedings of the tenth ACM SIGKDD international conference on Knowledge discovery and data mining table of contents; pp. 460-469, 2004.

Eamonn Keogh, Harry Hochheiser, and Ben Shneiderman; An Augmented Visual Query Mechanism for Finding Patterns in Time Series Data; Lecture Notes in Computer Science, Proceedings of the 5th International Conference on Flexible Query Answering Systems; Springer-Verlag; vol. 252212002; pp. 240-250, 2002.

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

Daniel A. Keim et al., "VisDB: Database Exploration Using Multidimensional Visualization," IEEE Graphics and Applications, vol. 14, No. 5, pp. 40-49 (1994).

Matthew O. Ward, "XmdvTool: Integrating Multiple Methods for Visualizing Multivariate Data," Proc. Visualization, pp. 326-331 (Oct. 1994).

H. Hochheiser et al., "Dynamic Query Tools for Time Series Data Sets: Timebox Widgets for Interactive Exploration," Information Visualization, vol. 3, pp. 1-18, 2004.

P. Buono et al., "Technical Research Report, Interactive Pattern Search in Time Series," Institute for Systems Research, TR 2005-57, pp. 1-11, 2004.

J. Yang et al., "Visual Hierarchical Dimension Reduction for Exploration of High Dimensional Datasets," Joint Eurographics/IEEE TCVG Symposium on Visualization, pp. 19-28 (May 2003).

Keim et al., "Pixel Bar Charts: a visualization technique for very large multi-attributes data sets," Information Visualization, 2001, pp. 1-14.

Hao et al., "Visual mining business service using pixel bar graphs," HP Technical Report, Jun. 29, 2004, pp. 1-7.

* cited by examiner

Pixel Bar    Color Scale

PIXEL CHARTS WITH DATA DEPENDENT DISPLAY SPACES

BACKGROUND

Business data is a source of valuable information and provides a competitive advantage if the data is quickly and accurately analyzed. Finding valuable information hidden in large amounts of data, though, is quite challenging since such information is concealed in the data. Visual data comparison techniques are extremely useful for revealing such valuable information hidden in data.

Prior visual data comparison techniques include simple graphical techniques, such as bar charts, pie charts, and x-y charts. These simple graphical techniques are easy to use but offer limited information, especially for visually evaluating specific content in large amounts of business data. For example, simple bar charts or pie charts show highly aggregated data. Regular bar charts do show aggregated data, such as average value or median value.

Traditional bar charts show aggregated information using bars that have varying heights. In an x-y axis bar chart, the height of a bar corresponds to a value of an attribute on the y-axis, while the x-axis designates categories for each of the bars.

DETAILED DESCRIPTION

Exemplary embodiments in accordance with the present invention are directed to systems, methods, and apparatus for building pixel bar charts that have bars with varying widths and varying heights.

One exemplary embodiment uses a graphical user interface (GUI) design that provides additional display dimensions in a bar chart to present more detailed information to a user. For example, users are visually presented with average values for each category but also with individual data values in order to reveal data distribution, patterns, trends, and exceptions. In general, exemplary embodiments use a pixel-oriented visualization method to show the data value distribution inside of a bar without losing the total value of a bar, such as total sales dollar amounts. Utilization of these pixel bar charts provides several data representation techniques, such as: (1) the bar height is used to represent the aggregated value; (2) the bar area is used to represent data volume; (3) the pixel color is used to represent the value of each transaction record and shows the distribution of data values and data patterns inside a bar, and (4) the ordering of pixels representing data with similar attribute values is used to show patterns, trends, and exceptions.

In one exemplary embodiment, in order to generate the GUI, one or more of several steps are implemented. First, pixels are added to a traditional bar chart. Each pixel represents a transaction record, and the bar height shows the average or total value across transactions. Area (i.e., height multiplied by width) of a bar shows the transaction volume and individual data point value distribution inside a bar. Further, pixel color shows a unique data item value (example, cost in dollars, response time in seconds, etc). This feature results in color patterns inside a bar that show the transaction data volume distribution.

Second, the different heights and different widths of pixel bars are created. In one embodiment, partition the bars along the x-axis based on data category, such as product type. Each bar represents a category, such as bar A, B, and C. A bar hash table is built and used to store the information on the starting pixel (the starting record number) to the ending pixel (the ending record number) in each bar and the number of pixels (i.e. area) in each bar. Next, the bar height of a pixel bar chart is calculated by: a) finding the height of the display area; b) finding the height of the bar with the highest bar value; c) assigning the height of the other bars proportionally to the highest bar; d) building a total value scale to represent each bar's total bar value; and e) storing the bar height information in the bar hash table. Next, the bar width is calculated by using the bar height and the area from the bar hash table (i.e., volume divided by height). Store the bar width is stored in the bar hash table.

Third, pixels are ordered in the bars. In one exemplary embodiment, pixels are ordered from bottom to top and left to right based on the value of each pixel. A color scale (example, light color to darker color) represents some value of each data item.

Fourth, pixels are automatically padded when there are not enough pixels to fill up the bar (example, a heuristic method is used to optimize the least padding). The color of the padded pixel uses the color (value) of the nearby pixels. For example: if bar height=3, number of pixels=10, then width=4, then:
xxxp
xxxp where x=pixel, p=pad
xxxx If pixels are too hard to see in the display, "zooming" is used to improve readability and aesthetics of the display. For example, pixels are replicated in magnitudes of two, four, etc. In one embodiment, users drilldown from a selected bar to the next level of a hierarchy as needed. Drilldown is used, for instance, whenever transaction data in a single bar of a chart is presented to show subcategories within that data.

Figure 1:
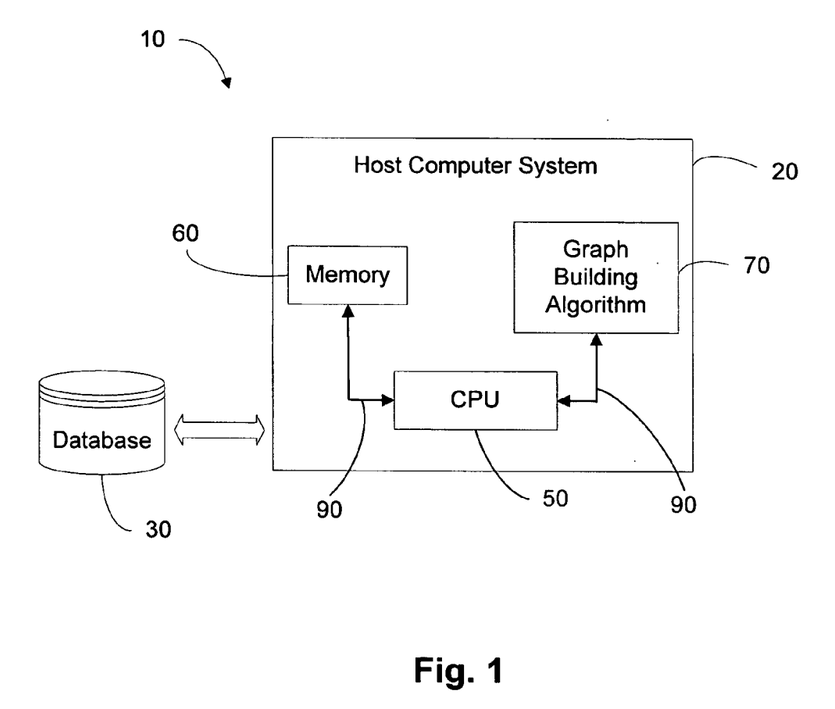
FIG. 1 illustrates an exemplary system in accordance with an embodiment of the present invention.

FIG. 1 illustrates an exemplary system 10 for generating pixel bar charts in accordance with exemplary embodiments. The system 10 includes a host computer system 20 and a repository, warehouse, or database 30. The host computer system 20 comprises a processing unit 50 (such as one or more processors of central processing units, CPUs) for controlling the overall operation of memory 60 (such as random access memory (RAM) for temporary data storage and read only memory (ROM) for permanent data storage) and a graph building algorithm 70 for constructing pixel bar charts. The memory 60 stores data, control programs, and other data associate with the host computer system 20. In some embodiments, the memory 60 stores the graph building algorithm 70. The processing unit 50 communicates with memory 60, data base 30, graph building algorithm 70, and many other components via buses 90.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

One exemplary embodiment implements a pixel-oriented visualization method to show data volume and value distribution inside of a bar of a pixel bar chart without losing a total value of the bar. Embodiments in accordance with the invention add information inside of a traditional bar chart such that data distribution, correlations, patterns, trends, and exceptions are simultaneously visible to a user in a single graphical display, image, or chart. Exemplary embodiments utilize different height and width pixel bars in charts and graphs. The construction or building of these pixel bar charts uses several techniques, such as, but not limited to, one or more of the following: (1) using the bar height to represent an aggregated value; (2) using the bar area (height multiplied by width) to represent volume; (3) using pixels to represent transaction records (such as invoices, sales, contracts, etc.); (4) using pixel color to represent the value of each transaction record matrix to show data value distribution and patterns inside a bar; and/or (5) ordering or arranging pixels with similar attributes together to provide easily recognizable patterns, trends, and exceptions in data. Pixel bar charts constructed in accordance with embodiments of the invention are as human intuitive as the traditional bar chart and allow users to see insight of a bar, not provided by common charting techniques.

In one exemplary embodiment, a pixel bar chart is generated that illustrates a y-axis with aggregated data values and maps a volume of data or pixels to a width of the columns of the bars along an x-axis (wherein area is width multiplied by height). In such embodiments, both bar value and bar volume are mapped to at least equally salient visual cues. Users are thus able to quickly identify a total value difference in a pixel bar chart.

Figure 2:
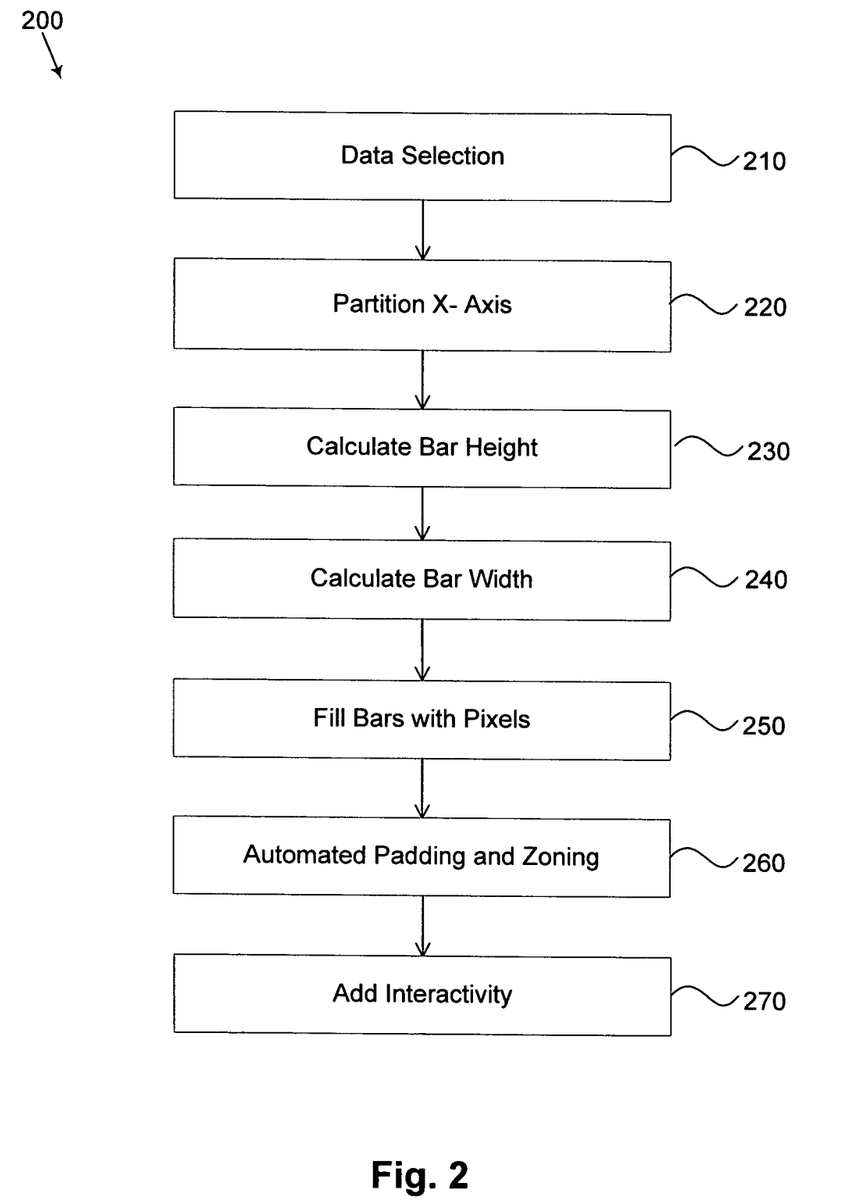
FIG. 2 is an exemplary flow diagram for building pixel bar charts in accordance with an embodiment of the present invention.

FIG. 2 provides an exemplary flow diagram for building pixel bar charts in accordance with an embodiment of the present invention. For illustration purposes, FIG. 2 is discussed in conjunction with specific examples illustrated in FIGS. 3A-3D. The examples provided in FIGS. 3A-3D are provided as illustrations for discussion and are not provided to limit embodiments in accordance with the invention.

According to block 210, data selection occurs. Here, attribute-based data structures are determined. For instance, structures for the x and y axes, ordering, and pixel coloring are determined.

Once the data selection occurs, the different heights and different widths of pixel bars are constructed. As discussed in connection with blocks 220-240, this construction includes partitioning the x-axis, calculating bar height, and calculating bar width.

Figure 3A:
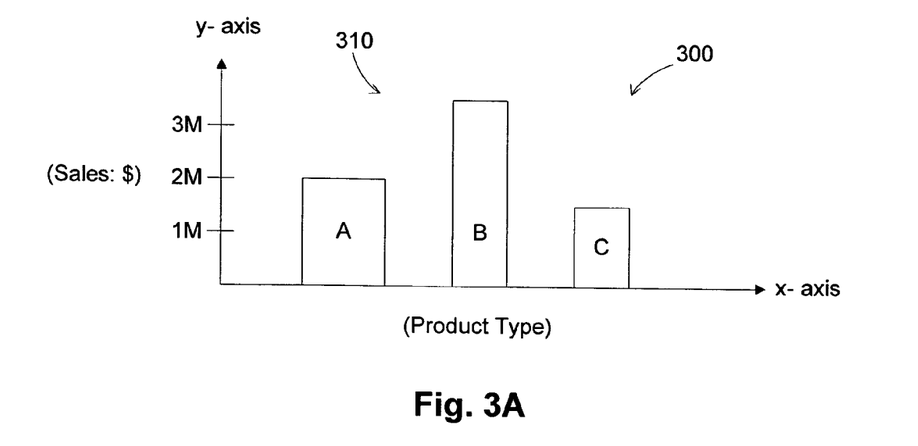
FIG. 3A is an exemplary diagram to illustrate partitioning an X-axis and calculating bar height in accordance with an embodiment of the present invention.

According to block 220, the x-axis is partitioned. Bars along the x-axis are partitioned or divided based on a select attribute. FIG. 3A shows a bar chart 300 having several bars 310 (shown as A, B, and C) that are partitioned along the x-axis based on product type and along the y-axis based on sales amount ($). Each bar represents a category, such as categories A, B, and C of the product type being an attribute in the sale data sets. In one exemplary embodiment, a bar hash table is built to store information on the number of pixels in each bar and on the starting pixel (i.e., the starting record number) to the ending pixel (i.e., the ending record number) in each bar.

According to block 230, the height of the bars is calculated. In one exemplary embodiment, bar height is calculated as the height of bars in a traditional bar chart (such as the bar chart 300 shown in FIG. 3A). For instance, first determine the height of the display area. Second, use the height of the bar with the highest bar value, such as total sales amount of bar B in FIG. 3A. Third, assign the height of the other bars according to proportional ratios to the highest bar. Next, build a total value scale to represent each bar's total bar value. Store the bar height information in the bar hash table.

According to block 240, the bar width is calculated. In one exemplary embodiment, the bar height and volume from the bar hash table is used to calculate the required bar width. The calculated bar width is stored in the bar hash table.

For discussion purposes, FIG. 3A is shown as a bar chart wherein each bar (A, B, and C) has a different height along the y-axis and a different width along the x-axis. The width of the bars in FIG. 3A is based on the calculation from the height and volume. As shown, the width of bar A is different than the widths of bars B and C.

Figure 3B:
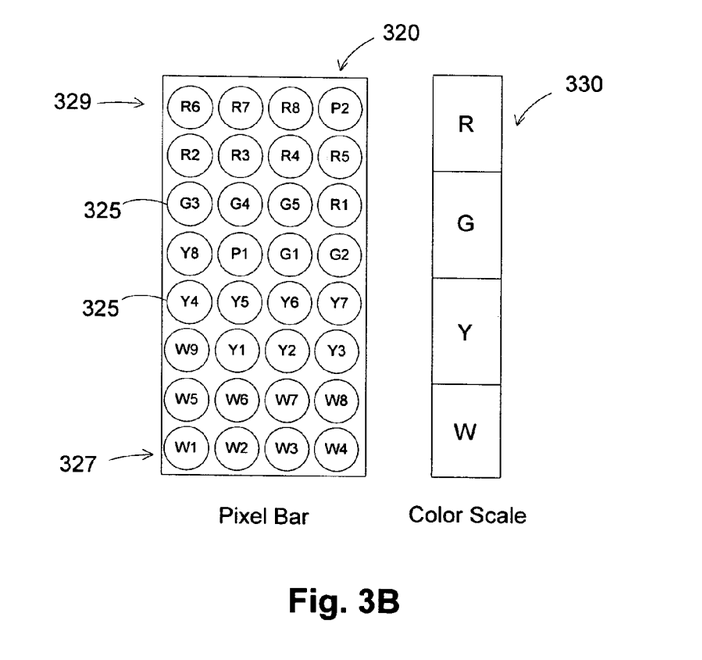
FIG. 3B is an exemplary diagram to illustrate filling a bar with colored pixels in accordance with an embodiment of the present invention.

According to block 250, the bars of the bar chart are filled with pixels. FIG. 3B shows a bar 320 filled with a variety of pixels 325. Each pixel 325 represents a transaction record and is colored in accordance with a transaction attribute value represented with a bar key or color scale 330. For illustration, letters are used to represent a group of colors (such as "W" for different degrees of white, "Y" for different degrees of yellow, "G" for different degrees of green, and "R" for different degrees of red). The numbers correspond to different shades of color and represent different values for the transaction records. Thus, W1 has a different value and hence color shade than W2; W3 has a different value and hence color shade than W2; etc. As discussed in more detail in connection with FIG. 3D, pixel bar charts use a continuous color map to represent different values in a transaction record. Further, some pixels are designed P1, P2, etc. These pixels represent "padded" pixels as discussed in more detail in connection with FIG. 3D.

In one exemplary embodiment, the pixels are arranged in a predetermined or specific order. For instance, the pixels are ordered from bottom to top and left to right based on the value of the selected attribute values. Pixels with lower values are placed at the bottom 327 of the bar 320, and pixels with higher values are placed at the top 329 of the bar 320.

Figure 3C:
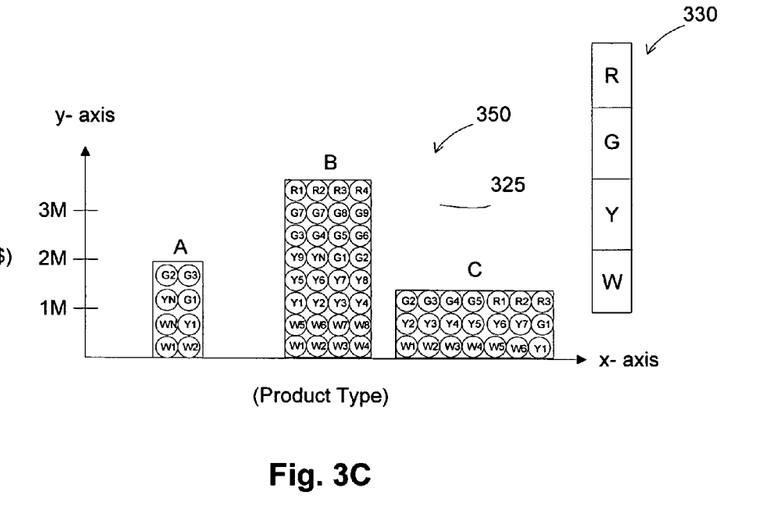
FIG. 3C is an exemplary diagram to illustrate a filled pixel bar chart in accordance with an embodiment of the present invention.

FIG. 3C shows a pixel bar chart 350 having three bars (A, B, and C) filled with pixels 325. As shown in the figure, the height of each bar shows the total value. For instance, bar B has a height on the y-axis that represents over $3 million in sales. The area of a bar (i.e., the height multiplied by the width) shows the bar volume. The bar volume represents the number of transactions records inside a bar. Further, pixel color is used to show the value of a distinguished data item (example, sales amount, response time, etc.). The color pattern in each bar also shows the data value distribution over each category (x-axis) of transactions.

The pixel bar chart 350 of FIG. 3C has numerous attributes. By way of example, these attributes include an x-axis attribute (for pixel partitioning, X) based on the data categories, a y-axis attribute (for value, Y), an ordering attribute (the pixels being arranged from bottom to top and left to right based on the value of pixels), and a color attribute (for coloring, C) that employs a color scale from light (example, white or yellow) to dark colors (example, red) to represent the value of each attribute.

Figure 3D:
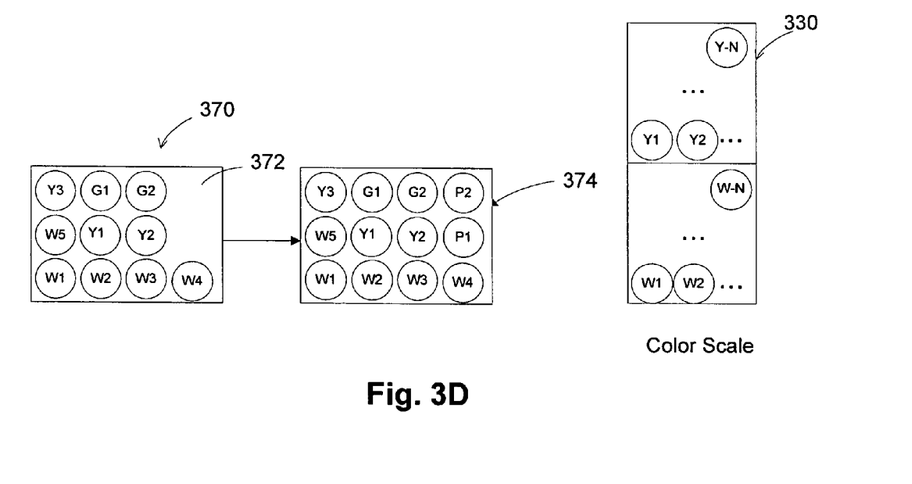
FIG. 3D is an exemplary diagram to illustrate padding a pixel bar in accordance with an embodiment of the present invention.

According to block 260, automated padding and zooming occur. In order to more readily visualize patterns and trends in data, one exemplary embodiment automatically pads bars when there are not enough pixels to completely fill a bar. FIG. 3D shows an unpadded bar 370 having several empty pixel locations 372. These empty locations are filled with pixels 374 (example, P1 and P2). One exemplary embodiment uses a heuristic method to optimize the least padding. The color of the padded pixel uses the color (i.e., value) of the nearby pixels. Looking to FIG. 3D, added pixel P1 is the color of yellow, and added pixel P2 is the color of green.

Exemplary embodiments also utilize automated zooming to provide best fit bars for display. Each pixel in a bar is enlarged for increased visibility. For instance, pixels are zoomed or enlarged by a factor of two, three, four, etc.

In one exemplary embodiment, pixels have color variations or shading within the same color or color scale. FIG. 3D shows an exemplary detailed view of how pixels are arranged in a bar to have continuous color variations as utilized, for example, in FIGS. 3A-3C and 4A-4B. As shown in FIG. 3D, each pixel on the bottom row (shown as W1, W2, W3, and W4) has a different variation of the color white. For example, W2 is a darker or different version of white than W1; W3 is a darker or different version of white than W2; etc. With this color variation (shown in each row W1, W 2, ...Y1, Y2 ... G1 G2 ... etc.) the bars utilize a continuous color scale based on the individual data value. In other words, since the value of pixel W1 is different than the value of pixel W2, the colors are also correspondingly different (example, the difference being visually represented with different shades, brightness, etc.).

FIG. 3D also shows a partial enlarged view of an exemplary color scale 330 for colors of white (W) and yellow (Y). As shown, each color in the color scale also has a continuous or varying degree of color variation that corresponds with the colors variation in the bars. For instance, the white area (designated with the Ws) are shaded with different degrees of white; the yellow area (designated with the Ys) are shaded with different degrees of yellow; etc.

According to block 270, various interactivities are added to the pixel bar chart. Exemplary pixel bar charts represent examples of interactive displays or outputs. As used herein, the term "interactive" means accepting input from a human such that users can enter data or commands (i.e., instructions to a computer or device to perform a specific task) or activate the display of additional data. The interactive displays are responsive to the user entering data or commands for obtaining transaction record level information, ranking or arranging bars, etc. Interactive graphs and displays also support drilldown on pixels or bars to get more detailed records. The term "drilldown" or "drill down" (or variations thereof) is used when referring to moving down through a hierarchy of data structure and/or files in a file system like that of Windows. The term may also mean clicking, selecting, and/or navigating through a series of dropdown menus or graphical illustrations in a graphical user interface. Drilldown layers, for example, allow the user to explore the graphical illustration in a hierarchical manner by pointing, clicking, and/or selecting on the part of the graphical illustration where more detail is needed but illustrate an exemplary embodiment for discussion.

Pixels in the graphical illustration represent a data item that enables the visualization of large volumes of data. The consistent or common color scale 330 (such as a color scale in FIG. 3B) is used through the various graphs. The color scale 330 represents the scale for data across various layers or graphs. A color scale can be generated with a variety of symbols, letter, markings, colors, indicia, etc. Further, the scale is divided into a plurality of ranges wherein each range has a different visual identification or marking, such as a set of different colors. For instance, the color white indicates a first range; yellow indicates a second range of colors; green indicates a third range of colors; and red indicates a fourth range of colors. Each range provides a set of continuous color for representing different values.

In one embodiment, the graphs are constructed and presented in a pixel-oriented layout to enable quick visualization of data distribution. In one embodiment, a pixel represents a data record, and color of the pixel represents the value of a data item. In FIG. 3C, the x-axis represents a product type, and the y-axis represents sales in dollars. Of course, representations in the x and y axes can be switched or altered and still be within the scope of embodiments in accordance with the invention. Further, the designations for each axis (i.e., x-axis as product type and y-axis as sales) are provided for illustration and not intended to limit embodiment in accordance with the invention.

In one exemplary embodiment, each pixel is encoded with information. For instance each pixel represents a separate transaction (example, a sales transaction, telephone call, duration of time, etc.). A user can "click" or otherwise activate or drilldown any individual pixel and get specific information or data regarding the individual transaction.

Embodiments in accordance with the present invention can also utilize multi-pixel bar charts. Multi-pixel bar charts use different color mappings with the same partitioning and ordering attributes. In other words, different attributes are mapped to different colors. Preferably, each pixel (for example, each customer) is located at the same relative location across all pixel bar charts. At the same time though, each pixel shows a different attribute (such as sales amount, quantities, locations, etc.). In turn, the color of each pixel varies according to the value of the corresponding attribute. The user can activate (such as "click-on") a pixel to get the corresponding attribute value.

Figure 4A:
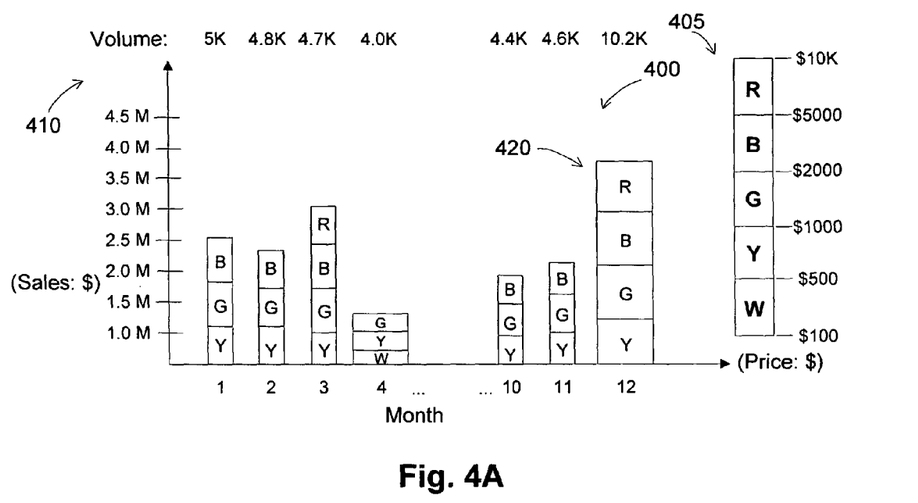
FIG. 4A is an exemplary pixel bar chart built in accordance with an embodiment of the present invention.

FIG. 4A illustrates an exemplary pixel bar chart 400 built in accordance with an embodiment of the present invention. In this exemplary embodiment, each pixel represents a transaction (example, an invoice), and each bar represents an attribute (examples, months of the year). Further, the x-axis illustrates various months (1, 2, 3, . . . ), and the y-axis illustrates sales in dollars ($).

A color scale 405 provides ranges for various dollar amounts. As shown, white (W) signifies a range of $100-$500; yellow (Y) signifies a range above $500-$1000; green (G) signifies a range above $1000-$2000; blue signifies a range above $2000-$5000; and red (R) signifies a range above $5000-$10,000.

A height of each bar represents values along the y-axis, while the size or volume of each bar represents a total number of invoices in a category. Volume for specific months is indicated along a top portion 410 of the chart. For instance, the month 1 had about $2.5 million in total sales with a volume of 5k units sold; and the month 12 had about $4.0 million in total sales with a volume of 10.2k units sold. As shown, the width and height of month 12 is greater than the width height of month 1, for example. Thus, the chart 400 visually distinguishes bars using both width along the x-axis and height along the y-axis.

The pixels within a bar are sorted and arranged from left to right and top to bottom to show a distribution of dollar amount. Color variations illustrate a distribution of sales for a given volume of each month. Pixel color is thus used to show sales patterns and trends, such as low sales (white or yellow) to high sales (blue or red). Outliers (example, red sales 420 at a top of a bar for month 12) illustrate an occurrence of high or extremes sales transactions.

The bars in chart 400 can be re-arranged in various ways to illustrate different information. In some embodiments, for instance, the bars are ranked, grouped in ascending or descending order, correlated between multiple and/or different attributes, etc. By way of example, FIG. 4B illustrates a pixel bar chart 450 with the pixel bars of FIG. 4A being ranked in accordance with an embodiment of the present invention.

Figure 4B:
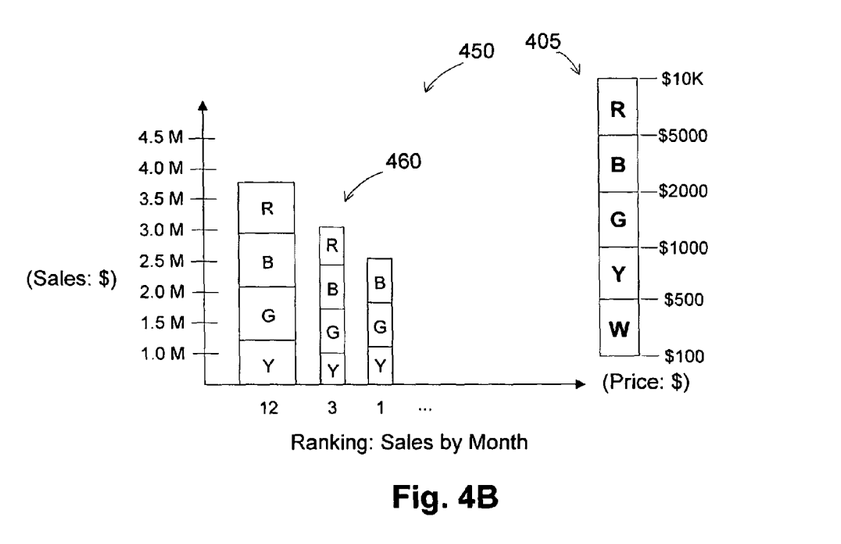
FIG. 4B is the pixel bar chart of FIG. 4A with the pixel bars being ranked in accordance with an embodiment of the present invention.

In FIG. 4B, pixel bars 460 are ranked according to amount of sales. Month 12 had the greatest dollar amount of sales and appears first. In one exemplary embodiment, such ranking of pixel bars occurs as a drilldown or interactive action from a user with regard to FIG. 4A.

In one exemplary embodiment, the flow diagrams and/or blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

Exemplary embodiments are illustrated with bar charts. Embodiments in accordance with the invention include a variety of graphs and charts, such as, but not limited to, pie charts, line charts, histograms, and diagrams, to name a few examples. In such embodiments, pixels are used, for example, to represent data or information points or locations.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, specific numerical data values (such as specific quantities, numbers, categories, etc.) or other specific information should be interpreted as illustrative for discussing exemplary embodiments. Such specific information is not provided to limit the invention. Further, although bars are used in the graphs, other graphical illustrations or shapes can also be used.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the host computer system of FIG. 1, a client computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
building, by a computer, a pixel bar chart having plural bars with different heights and different widths, the plural bars including pixels representing respective data records, wherein building the pixel bar chart comprises:
   determining a height of each of the plural bars based on an aggregate value that is computed by aggregating values of a first attribute of the data records represented by the corresponding bar, wherein determining the height of each of the plural bars comprises:
      determining a height of a first of the plural bars having a larger aggregate value from among the aggregate values computed for the respective plural bars; and
      determining, based on the height of the first bar, a height of each of a remainder of the plural bars excluding the first bar, and
   determining a width of each of the plural bars based on a number of the data records represented by the corresponding bar; and
simultaneously displaying, by the computer, the plural bars of the pixel bar chart.

2. The method of claim 1 further comprising ordering pixels inside each of the plural bars, to show data patterns and data trends of transactions for each bar, based on attribute values inside the data records.

3. The method of claim 1 further comprising assigning different colors to the pixels inside each of the plural bars according to different values of a second attribute in the data records.

4. The method of claim 1, wherein determining the width of each of the plural bars is based on both the height of and the number of data records represented by each bar.

5. The method of claim 1, wherein determining the height of each of the remainder of the plural bars is further based on a proportional ratio of the corresponding aggregate value computed for each of the remainder of the plural bars to the aggregate value computed for the first bar.

6. A method comprising:
constructing, by a computer, a pixel bar chart having plural bars with colored pixels that represent transaction records, wherein constructing the pixel bar chart comprises determining a height of each of the plural bars based on an aggregate value that is computed by aggregating values of a first attribute of the transaction records represented by the corresponding bar, wherein determining the height of each of the plural bars comprises:
   determining a height of a first of the plural bars having a larger aggregate value from among the aggregate values computed for the respective plural bars; and
   determining, based on the height of the first bar, a height of each of a remainder of the plural bars excluding the first bar; and displaying, by the computer in a single display, the plural bars having both different heights and different widths, the plural bars having a bar area that represents a number of transaction records inside the corresponding bar.

7. The method of claim 6 further comprising:
assigning different colors to the colored pixels in each of the plural bars according to different values of a second attribute of the transaction records represented by the corresponding bar; and
ordering the colored pixels in each of the plural bars according to values of an ordering attribute of the transaction records represented by the corresponding bar.

8. The method of claim 6 further comprising automatically adding padding pixels to a given bar of the plural bars if the given bar does not include enough colored pixels representing transaction records to completely fill the given bar, wherein the padding pixels do not represent any transaction records and are assigned colors of neighboring colored pixels.

9. The method of claim 6 further comprising automatically enlarging pixels in at least one of the plural bars to improve visual display of the at least one of the plural bars.

10. The method of claim 6 further comprising ordering the pixels in each of the plural bars, wherein the ordering occurs from bottom to top and from left to right based on attribute values associated with the pixels.

11. The method of claim 6 further comprising constructing a hash map that contains starting positions for pixels in each of the plural bars and ending positions for pixels in each of the plural bars.

12. A computer system, comprising:
at least one processor to:
generate an interactive pixel bar chart that includes plural bars having different heights, different widths, and colored pixels inside the plural bars, the colored pixels representing respective data records;
determine the height of each of the plural bars based on an aggregate value that is computed by aggregating values of a first attribute of the data records represented by the corresponding bar, wherein the at least one processor is to determine the height of each of the plural bars by:
determining a height of a first of the plural bars having a larger aggregate value from among the aggregate values computed for the respective plural bars; and
determining, based on the height of the first bar, a height of each of a remainder of the plural bars excluding the first bar;
determine the width of each of the plural bars based on a number of the data records represented by the corresponding bar; and
simultaneously display the plural bars in a display device.

13. The computer system of claim 12, wherein the at least one processor is to further partition, based on a data category attribute of the data records, an x-axis of the pixel bar chart such that each of the plural bars represents a respective different data category represented by the data category attribute.

14. The computer system of claim 12, wherein the at least one processor is to order, within each of the plural bars, the colored pixels according to values of at least one ordering attribute of the data records represented by the corresponding bar.

15. The computer system of claim 12, wherein the determining of the height of each of the remainder of the plural bars is further based on a proportional ratio of the corresponding aggregate value computed for each of the remainder of the plural bars to the aggregate value computed for the first bar.

16. A non-transitory computer readable medium having instructions for causing a computer to:
build a pixel bar chart having plural bars with different heights and different widths, the plural bars including pixels representing respective data records, wherein building the pixel bar chart comprises:
determine a height of each of the plural bars based on an aggregate value that is computed by aggregating values of a first attribute of the data records represented by the corresponding bar, wherein determining the height of each of the plural bars comprises:
determining a height of a first of the plural bars having a largest aggregate value from among the aggregate values computed for the respective plural bars; and
determining, based on the height of the first bar, a height of each of a remainder of the plural bars excluding the first bar;
determine a width of each of the plural bars based on a number of the data records represented by the corresponding bar; and
simultaneously display the plural bars of the pixel bar chart.

17. The non-transitory computer readable medium of claim 16, wherein the instructions are for causing the computer to further:
order the pixels in each of the plural bars based on values of at least one ordering attribute of the data records represented by the corresponding bar.

18. The non-transitory computer readable medium of claim 16, wherein the instructions are for causing the computer to further:
assign colors to the pixels within each of the plural bars according to values of a coloring attribute of the data records represented by the corresponding bar.

19. The non-transitory computer readable medium of claim 18, wherein the instructions are for causing the computer to further:
add padding pixels to a given bar of the plural bars if the given bar does not include enough pixels representing data records to completely fill the given bar, wherein the padding pixels do not represent any data records and are assigned colors of neighboring pixels.

* * * * *